United States Patent [19]

Wize

[11] 4,432,524

[45] Feb. 21, 1984

[54] THREE POINT SEAT ADJUSTER

[75] Inventor: Gary A. Wize, Washington, Mich.

[73] Assignee: General Motors Corporation, Detroit, Mich.

[21] Appl. No.: 288,165

[22] Filed: Jul. 29, 1981

[51] Int. Cl.³ .............................................. A45D 19/04
[52] U.S. Cl. .................................... 248/395; 248/430; 297/318
[58] Field of Search ............... 248/395, 393, 429, 430; 297/317, 318

[56] References Cited

U.S. PATENT DOCUMENTS

| 1,887,077 | 11/1932 | Westrope | 248/429 |
| 1,891,457 | 12/1932 | Stannard | 248/429 |
| 1,921,224 | 8/1933 | Floraday | 248/429 |
| 2,225,074 | 12/1940 | Miller . | |
| 2,576,365 | 11/1951 | Scott et al. . | |
| 2,600,886 | 6/1952 | Korner . | |
| 3,170,728 | 2/1965 | Barenyi . | |
| 3,368,840 | 2/1968 | Dangauthier . | |

FOREIGN PATENT DOCUMENTS

| 1680150 | 1/1977 | Fed. Rep. of Germany | 248/429 |
| 455159 | 2/1950 | Italy | 248/429 |

Primary Examiner—James T. McCall
Attorney, Agent, or Firm—Patrick M. Griffin

[57] ABSTRACT

A three point seat adjuster for a vehicle car seat includes a generally Y shaped frame for supporting a vehicle seat. The Y shaped frame includes a pair of transversely extending leg members supported by rollers on a pair of rear track members mounted on the vehicle floor and a longitudinally extending integral stem member which is slidably engaged through a journal in a forwardly mounted guide bracket. The guide bracket is pivotally mounted to the vehicle floor. A release mechanism associated with the guide bracket releasably locks the stem member to the guide bracket in a plurality of positions.

2 Claims, 7 Drawing Figures

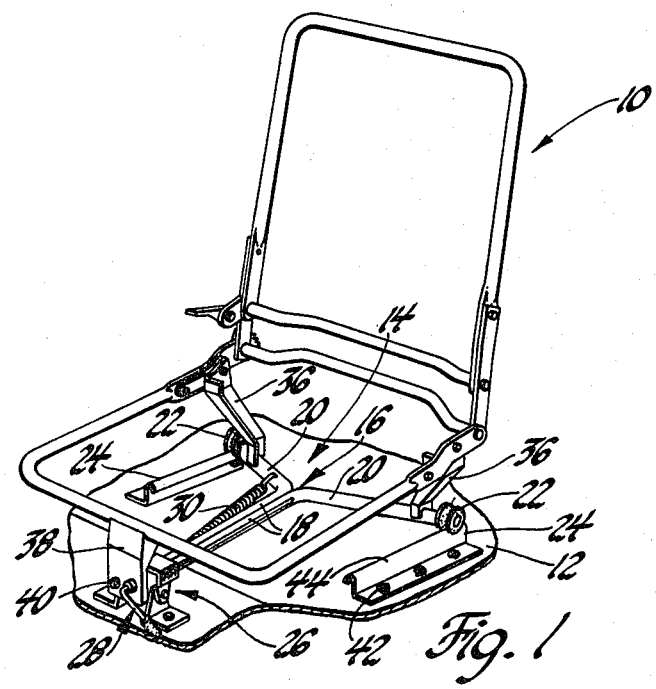
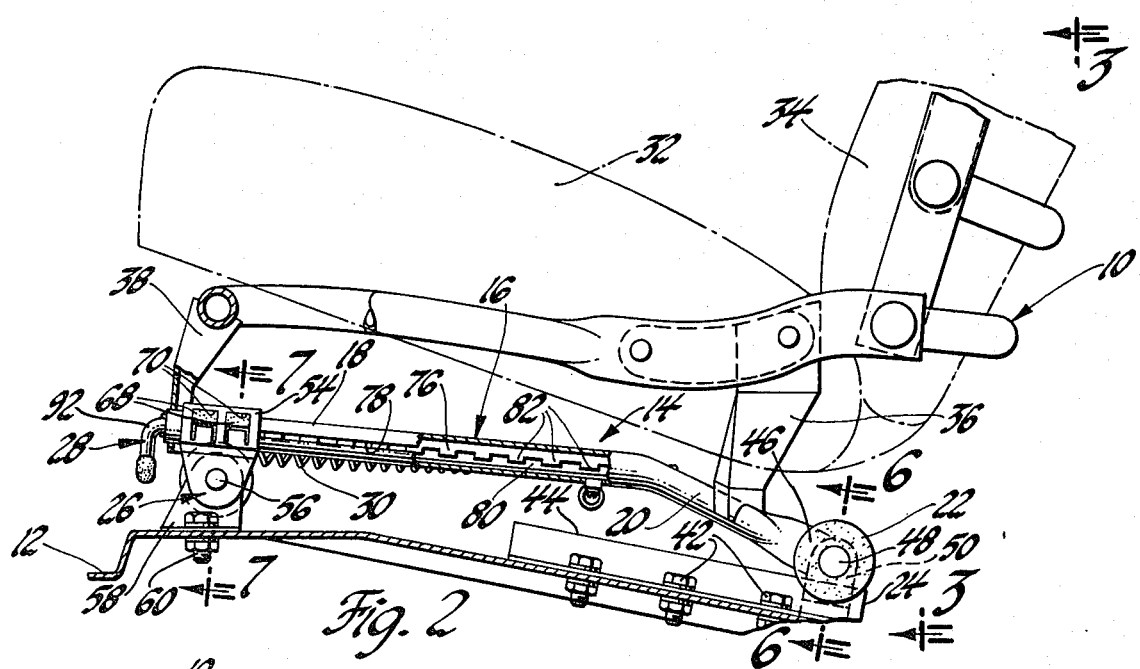
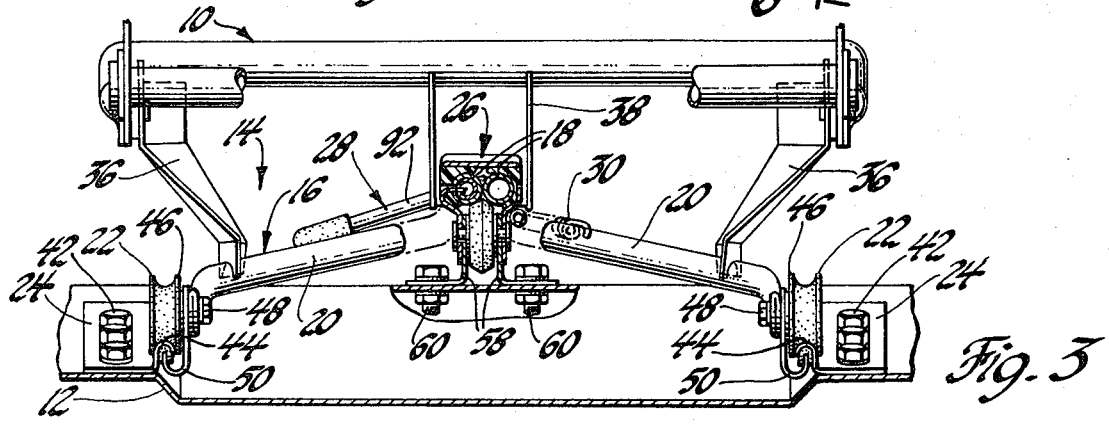

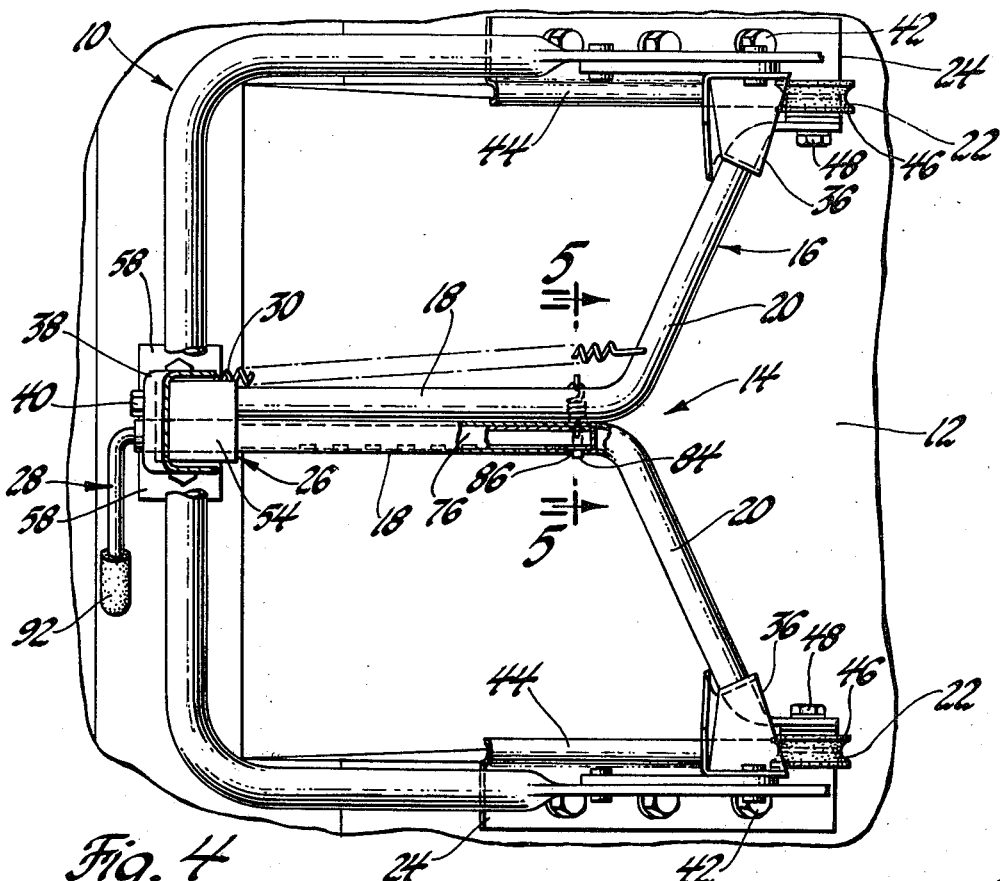
Fig. 4
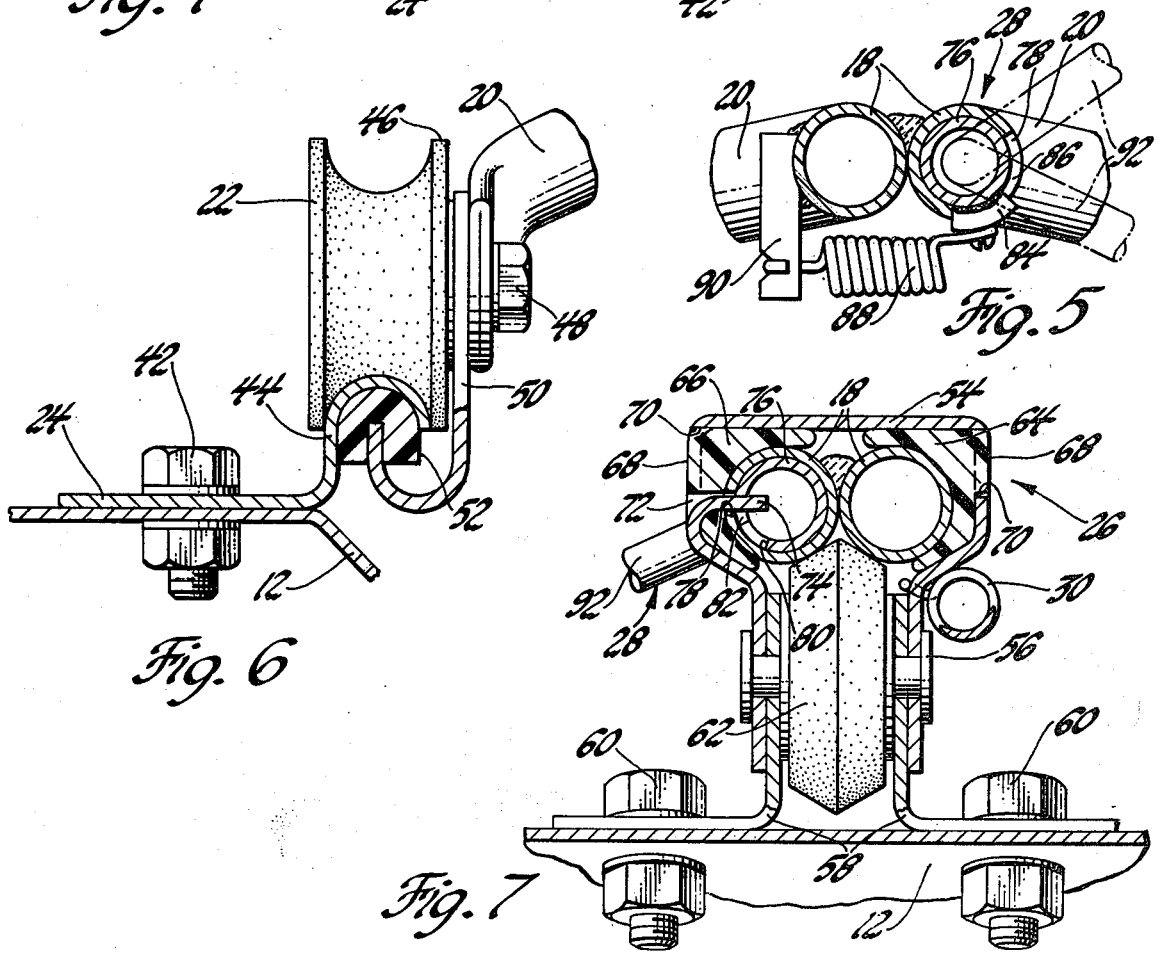
Fig. 6
Fig. 5
Fig. 7

THREE POINT SEAT ADJUSTER

BACKGROUND OF THE INVENTION

This invention relates to seat adjusters, and particularly to a seat adjuster which provides secure, three point adjustable support for a seat with respect to the floor of a vehicle or the like.

Known seat adjusters generally include a pair of parallel guide tracks or slideways mounted to the vehicle floor and extending for essentially the entire length of the seat frame. These adjusters may also incorporate various drive mechanisms and pan angle adjustment devices which occupy some of the space available beneath the seat.

A three point seat adjuster shown in Dangauthier U.S. Pat. No. 3,368,840 shortens the slideways and mounts them toward the rear of the seat to provide two points of support for the seat frame, while a forwardly mounted pivot placed halfway between the guide tracks provides the other point of support. The seat frame is secured to the forward pivot by a V shaped frame having its vertex pivotally mounted to the floor mounted pivot and its legs pivotally mounted to the seat frame.

SUMMARY OF THE INVENTION

The three point seat adjuster of the subject invention includes a single Y shaped support frame mounted rigidly beneath the seat with the stem of the Y running longitudinally beneath the seat and the two legs of the Y extending angularly therefrom. The legs are mounted by roller mechanisms to each of a pair of relatively short, upwardly angled, parallel guide tracks mounted to the vehicle floor toward the rear of and beneath the seat frame of the seat. This provides two points of support for the seat. The longitudinally extending stem of the Y shaped support frame is received through a journal of a forwardly disposed guide member located approximately midway between the guide tracks and beneath the front of the seat frame. The guide member is in turn pivoted to a support bracket securely mounted to the vehicle floor to provide the third point of support.

As the seat is moved forward, the rear of the seat is moved up as the roller mechanisms move along the guide tracks and the stem of the Y shaped frame pivots downwardly as the guide member pivots about the support bracket. A release mechanism mounted to the stem portion of the Y shaped frame releasably and securely locks the stem portion within the guide member to releasably lock the seat with respect to the vehicle in a plurality of positions.

It is therefore an object of the present invention to provide an improved three point seat adjuster having a single, Y shaped frame attached beneath the seat frame with two points of support being provided by the legs of the Y shaped frame and the third point of support being provided by the stem of the Y shaped frame. It is another object of the invention to provide such a seat adjuster wherein the stem of the Y shaped frame is slidably supported directly within a journal in a forwardly mounted guide member. It is a further object of the invention to provide such a seat adjuster wherein the guide member is pivotally mounted to the vehicle floor. It is yet another object of the invention to provide such a seat adjuster wherein a release mechanism releasably locks the stem of the Y shaped frame within the guide member in a plurality of positions.

BRIEF DESCRIPTION OF THE DRAWINGS

These and other objects of the invention will appear from the following written description and the drawings in which:

FIG. 1 is a perspective view of a seat frame mounted to the floor of a vehicle by a three point seat adjuster according to the invention.

FIG. 2 is an enlarged partially broken away side view of the seat frame and the seat adjuster.

FIG. 3 is a partially broken away rear view taken along line 3—3 of FIG. 2.

FIG. 4 is a partially broken away top plan view.

FIG. 5 is an enlarged sectional view taken along line 5—5 of FIG. 4.

FIG. 6 is an enlarged sectional view taken along line 6—6 of FIG. 2; and

FIG. 7 is an enlarged sectional view taken along line 7—7 of FIG. 2.

DESCRIPTION OF THE PREFERRED EMBODIMENT

Referring first to FIG. 1, a vehicle seat frame generally designated 10 is mounted to the floor 12 by the three point seat adjuster mechanism of the invention designated generally at 14. The seat adjuster mechanism 14 includes a Y shaped frame 16 which provides the three point support of seat frame 10 to floor 12. The Y shaped frame 16 includes a pair of contiguous tubular stem members 18 welded or otherwise secured together and a pair of tubular legs 20 which are integral with and extend angularly from stem members 18. Two points of the three point support are provided by legs 20, each end of which is slidably mounted by a roller mechanism 22 to one of a pair of parallel, rearwardly mounted guide tracks 24 which are in turn mounted to floor 12. The other point of the three point support is provided by stem members 18 which are securely and slidably received within a forwardly mounted guide member 26 also mounted to the floor 12. A latch mechanism generally designated at 28 releasably secures and locates the Y shaped frame 16 in a plurality of horizontally adjusted positions. A conventional spring 30 biases Y shaped frame 16 forwardly to assist in forward motion of seat frame 10.

The details of the attachment of seat frame 10 to the Y shaped frame 16 may be seen by referring to FIGS. 2 and 3. Seat frame 10 supports a conventional seat cushion 32 and seat back 34 which are shown in dash lines. The rear of seat frame 10 is secured to Y shaped frame 16 by a pair of rear seat frame support brackets 36 each having an upper end riveted or otherwise secured to a side of seat frame 10 and a lower end welded to a leg 20 of Y shaped frame 16. The front of seat frame 10 is secured to Y shaped frame 16 by a front seat frame support bracket 38, the upper end of which is welded to the front of seat frame 10 and the lower end of which is secured to the front of stem members 18. In the embodiment disclosed, front bracket 38 is provided with a pair of apertures, one of which closely receives the end of the stem member 18 which contains latch mechanism 28. The other stem member 18 is secured to bracket 38 by a bolt 40 threaded into the end thereof. One or both of stem members 18 could be welded or otherwise secured to bracket 38, if desired. Thus, rear brackets 34 and front bracket 38 provide secure support of seat frame 10 to Y shaped frame 16 so that it slides therewith as Y shaped frame 16 is adjusted fore and aft with respect to floor 12 between a plurality of positions, as will be described below.

Details of the two rearward points of support for Y shaped frame 16 may be seen in FIGS. 4 and 6. Each guide track 24 is attached by bolts 42 to a portion of floor 12 which slopes upwardly with respect to the horizontal, as seen in FIG. 2. Each guide track 24 has an upper bearing portion 44 of semicircular cross-section. Each roller mechanism 22 includes a roller 46 of nylon or similar plastic material provided with a groove of semicircular cross-section matching bearing portion 44. Each roller 46 is rotatably attached to a flattened end of leg 20 by a pivot 48, and a hook shaped bracket 50 is also attached to pivot 48. A nylon shoe 52 on the end of hook shaped bracket 50 abuts the under surface of the bearing portion 44 of guide track 24 and retains roller 46 thereto as it slides up and down the guide track. The close fit of roller 46 with bearing portion 44 also serves to resist side to side twisting of Y shaped frame 16 as it moves.

The other point of the three point support is provided by the slidable retention of tubular stem members 18 within front guide member 26, the details of which may be seen in FIG. 7. Guide member 26 includes a clevis shaped guide bracket 54 which is mounted by pivot 56 to a pair of L-shaped mounting brackets 58, each of which is mounted by bolts 60 to floor 12. Pivot 56 rotatably supports a roller 62 of nylon or similar material between the L shaped brackets 58. The periphery of roller 62 is generally V shaped in cross-section and fits closely between and in rolling contact with stem members 18. A double cylindrical journal is formed within guide bracket 54 by a pair of support blocks 64 and 66 made of nylon or other similar material. Each support block has an interior surface which closely conforms to approximately 180° of the exterior of a stem member 18 and an outer surface which closely conforms to the inside of guide bracket 54 in order to provide secure support for stem members 18. Each block 64 and 66 is provided with a pair of side by side square projections 68 which fit closely within a matching pair of apertures 70 stamped into each side of front bracket 54, these being best visible in FIG. 2. This close containment of projections 68 within apertures 70 prevents each block from moving axially within guide bracket 54. In addition, support block 66 includes a pair of apertures 72 through which pass a pair of flanges 74 which are lanced into one side of bracket 54. Flanges 74 operate as part of the releasable latch mechanism 28 described below.

The details and operation of the latch mechanism 28 may be understood by referring to FIGS. 2, 5 and 7. One of the stem members 18 closely contains an inner tubular member 76 which may be seen through the cutaway section of FIG. 2 and in cross-section in FIGS. 5 and 7. The one stem member 18 and inner tubular member 76 are each provided with aligned elongated slots 78 and 80 respectively. The bottom edge of slot 80 is straight while the top edge includes a series of squared teeth 82 which closely interlock with the pair of flanges 74. Referring to FIG. 5, a metal rib 84 in the shape of an annular section is welded or otherwise attached to inner tubular member 76 proximate the end thereof and closely fitted within and extending slightly through a matching groove 86 defined in stem member 18. Groove 86 opens to elongated groove 78 in stem member 18. Rib 84 is located such that when inner tubular member 76 is rotated counterclockwise, as viewed in FIG. 5, rib 84 stays within groove 86 and does not strike the top edge of slot 78. A spring 88 hooked between rib 84 and a spring retainer 90 welded to the adjacent stem member 18 biases inner tubular member 76 clockwise, while the close fit of rib 84 within groove 86 prevents inner tubular member 76 from moving axially within stem member 18. Completing the latching mechanism, a lever 92 is securely attached to the front of inner tubular member 76 and rests in the lower dash line position of FIG. 5 when seat frame 10 is stationary.

To change the position of seat frame 10, lever 92 is rotated counterclockwise to the upper dash line position of FIG. 5. This rotates inner tubular member 76 counterclockwise against the bias of spring 88 and moves teeth 82 out of engagement with flanges 74, thus allowing stem members 18 to move through guide bracket 54 and allowing rollers 46 to roll up guide tracks 24. As seat frame 10 moves forwardly, it is apparent that the seat angle will flatten as the rear of Y shaped frame 16 is moved up and guide bracket 54 rotates slightly downward about pivot 56. This change of seat angle is desirable for shorter occupants. When lever 92 is released, spring 88 rotates inner tubular member 76 clockwise to engage two of the teeth 82 with flanges 74 and lock Y shaped frame 16 in position. The reverse occurs when the seat is moved backward.

Thus an improved adjustable three point seat adjuster has been provided.

The embodiments of the invention in which an exclusive property or privilege is claimed are as follows:

1. A seat adjuster providing three point support of a seat to the floor of a vehicle or the like, comprising,
    a pair of generally parallel, rearwardly disposed guide tracks mounted to the vehicle floor,
    a forwardly disposed guide member including a guide bracket pivotally joined to a floor mounted bracket, the guide bracket including a pair of journals and a roller between the journals,
    a generally Y shaped seat frame support attached to the seat and including a pair of tubular stem members, each slidably extending through a respective guide bracket journal and engaging the roller to provide a first point of support, the seat frame support further including a pair of leg members, each extending angularly from a stem member and respective to a guide track,
    roller means slidably supporting each leg member on a respective guide track, the roller means sliding up and down the guide tracks as the seat frame support is moved forward and backward, the guide bracket pivoting relative to the floor as the seat frame support moves relative to the journals and roller,
    and releasable locking means selectively engageable between one of the stem members and the guide bracket to releasably lock the stem members within the guide bracket in a plurality of positions.

2. A seat adjuster providing three point support of a seat to the floor of a vehicle or the like, comprising,
    a pair of generally parallel, rearwardly disposed guide tracks mounted to the vehicle floor,
    a forwardly disposed guide member including a guide bracket pivotally joined to a floor mounted bracket, the guide bracket including a roller, a generally Y-shaped seat frame support attached to the seat and including a pair of contiguous stem members, each slidably extending through the guide bracket with the roller fitted between the stem members in rolling contact therewith to provide a first point of support, the seat frame support further including a pair of leg members, each extending angularly from a stem member and respective to a guide track, means supporting each leg member on a respective guide track for sliding movement up and down the guide tracks as the seat frame support is moved forward and backward, the guide bracket cooperatively pivoting relative to the floor as the seat frame support moves relative to the roller, and releasable locking means selectively engageable between one of the stem members and the guide bracket to releasably lock the stem members to the guide bracket in a plurality of positions.

* * * * *